J. L. MAHONEY.
JOINTURE FOR VULCANIZED RUBBER PARTS.
APPLICATION FILED JUNE 29, 1918.
1,314,343.
Patented Aug. 26, 1919.
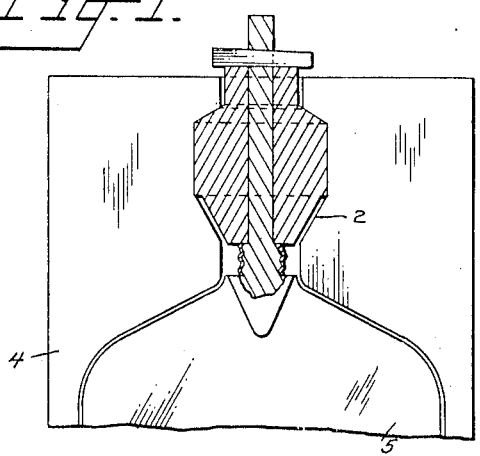
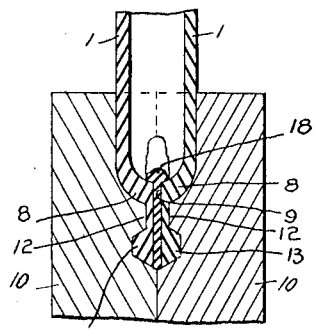
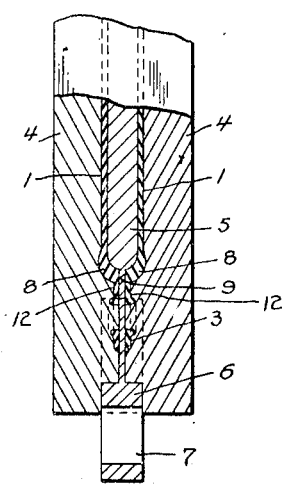
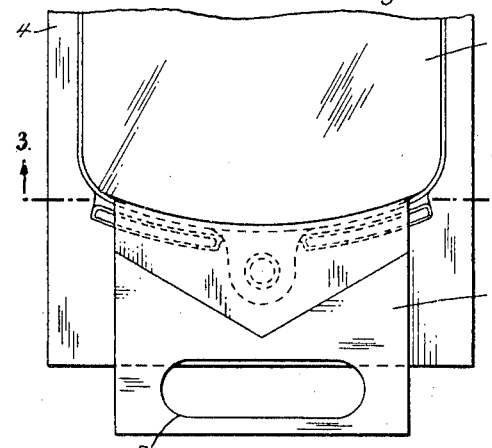
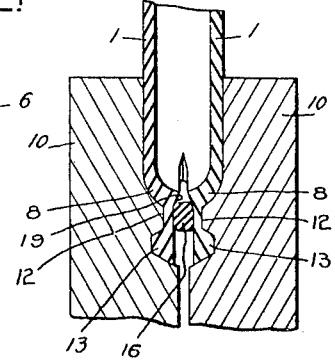
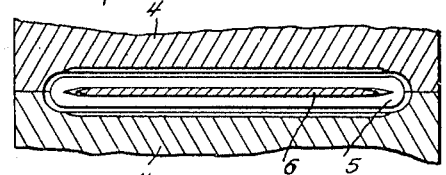
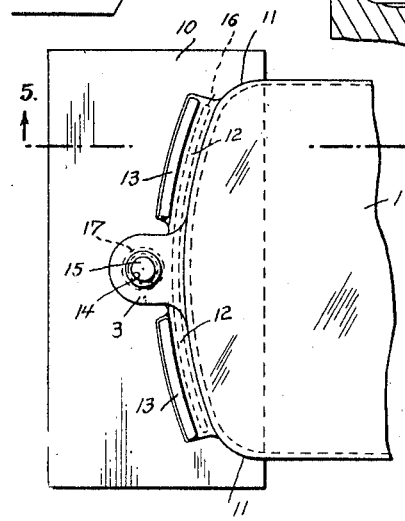
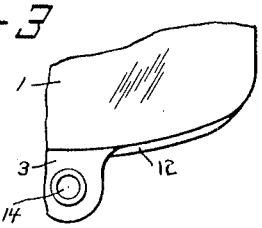
Inventor.
Jeremiah L. Mahoney,
By his Attorney.
Ernest Hopkinson

UNITED STATES PATENT OFFICE.

JEREMIAH L. MAHONEY, OF NEW HAVEN, CONNECTICUT, ASSIGNOR TO THE GOODYEAR'S INDIA RUBBER GLOVE MANUFACTURING COMPANY, A CORPORATION OF CONNECTICUT.

JOINTURE FOR VULCANIZED-RUBBER PARTS.

1,314,343.  Specification of Letters Patent.  Patented Aug. 26, 1919.

Original application filed January 15, 1918, Serial No. 211,904. Divided and this application filed June 29, 1918. Serial No. 242,646.

*To all whom it may concern:*

Be it known that I, JEREMIAH L. MAHONEY, a citizen of the United States, residing at New Haven, county of New Haven, State of Connecticut, have invented certain new and useful Improvements in Jointures for Vulcanized-Rubber Parts, of which the following is a full, clear, and exact description.

This application is a division of my copending application Serial No. 211,904 and relates to jointures of vulcanized rubber parts and has for its principal object the joining of rubber parts that have been previously vulcanized.

A further object is to maintain, in the carrying out of my invention, a pre-determined relationship in the positions of the joined parts.

A further object is to provide an article that may be made more quickly and will require less apparatus in making the jointures of the vulcanized rubber parts.

While my invention is not confined to any specific article of manufacture, it is however especially adapted for use in the manufacture of hollow rubber articles in which are formed temporary openings for the withdrawal therethrough of the forming cores about which the articles are vulcanized and which openings must be subsequently, permanently closed to produce the finished articles. The invention is more especially directed to the manufacture of hot water bottles and similar articles wherein the filling neck is too small to permit of the withdrawal of the core therefrom.

For convenience, and to facilitate a clear understanding of the advantages gained, my invention will therefore be described and illustrated in connection with the production of a hot water bottle, from which description its broader scope and application will at once be apparent.

With the above and other objects in view, which will readily appear as the nature of the invention is better understood, the same consists in the novel steps, combination, and arrangement of parts hereinafter more fully described, illustrated, and claimed.

Referring to the drawings forming part of the specification:—

Figure 1 is a front view of the lower mold section, and core.

Fig. 2 is a detail vertical central sectional view.

Fig. 3 is a sectional view taken on the line 3—3 of Fig. 1.

Fig. 4 is a front view of a closing mold section showing the base of the bottle supported therein.

Fig. 5 is an enlarged sectional view along the line 5—5 of Fig. 4.

Fig. 6 is a fragmental view of one half of the finished joint and,

Fig. 7 is a sectional view similar to Fig. 5 but showing a modification.

Hot water bottles of the type here referred to are usually formed from sheeted vulcanizable rubber cut or died out to form blanks of the desired patterns to form the several parts of the bottle, such for instance as the neck, tab and body portions. These are assembled in a mold about a suitable core and vulcanized after which the core is withdrawn through a suitable opening and the opening finally closed. In the present instance, the blanks are cut from sheeted rubber stock to form the sides 1—1, the neck portion 2 and the tab 3. These are assembled in the mold sections 4—4 about a core 5 which has a removable portion for forming the neck 2 of the bottle which may be of any desired or well-known construction.

The core 5 is provided with a tongue 6 which protrudes through the base of the bottle and serves to maintain the edges separated during vulcanization of the bottle, in order to provide an opening for finally withdrawing the core therethrough. The tongue 6 is made comparatively long to provide a hand-hole 7 to facilitate the withdrawal of the core from the bottle. It is not essential however that the hole or slot for the withdrawal of the bottle be formed in the bottle previous to its vulcanization, for it is obvious that the sides may be vulcanized in contact throughout their entire edges and a suitable opening or slot cut after vulcanization.

When the parts have been cut to suitable patterns they are assembled within their respective mold sections, the core placed in position and the mold sections brought together in the usual manner. During this operation, the margins of the side walls are turned inwardly toward each other and finally when the mold sections are closed they contact along their edges to form a butt joint. The stock at these marginal portions is slightly thickened to provide a correspondingly increased area for the abutting surfaces forming the joint. In the present instance, I prefer to provide a still thicker portion along the bottom edges 8—8 about the slot 9 in order that a sufficiently broad abutting joint may be subsequently made when closing the slot to give the required strength thereto, as will later more fully appear. Moreover in the preferred embodiment, the slot or opening 9 is formed with more or less rounding or V-shaped end portions which give further strength to the joint and the tongue 6 is conveniently formed to mold the slot with converging opposed walls to form the V-shaped ends. The wall of the tongue 6 instrumental in forming the opening may be of any desired thickness and the outer face of the margins about the opening may be in its original shape slightly bulged outwardly so that when the closure is effected the outer opposing surfaces of the margins about the opening will be brought to assume relative positions corresponding to the relative positions of the margins about the remainder of the body portion of the bottle in order to preserve uniformity of appearance about the entire body of the bottle. In Fig. 2, this feature is shown by bulging the thickened portions 8—8 slightly outwardly so that when the slot 9 is closed these bulging faces will be brought slightly closer together to correspond with the margins which were vulcanized together simultaneously with the vulcanization of the rubber material, constituting the bottle. Of course, in shaping the margins about the slot to produce the desired final result much will depend upon the quantity of vulcanizable rubber which is to be inserted in the slot. For instance, if only rubber cement is to be used the bulged portions would be sufficient to approximately account for the thickness of the portion 6 forming the opening. While if a strip of vulcanizable rubber is used to form the closure, and the strip in its finally compressed state be of substantially the thickness of the tongue then little or no bulging would be necessary.

As my invention contemplates the closing of the opening by operations performed entirely from one side of the bottle and as it further contemplates the definite relative positioning of the parts about the opening, I provide a closing mold of special construction comprising the sections 10—10. The mold sections are provided with cavities 11—11 adapted to receive the portion of the bottle containing the slot or opening and to afford supporting walls to engage the parts to be joined from corresponding sides to accurately aline them with each other. It is of primary importance that the joint be so nicely produced and the opposed parts so accurately register that besides giving the required strength to withstand the pressure test which the bottle must be subjected to, there will be little or no manifestation of the existence of a joint at this portion, in order to make a readily salable article.

The joint forming the closure is usually made with the aid of pressure, previous to or during final vulcanization, and this pressure has a tendency to force the parts to be joined away from the exterior supporting wall provided by the mold sections so that the opposing edges will not accurately register in the final product, thereby besides making a weak joint also producing an unsightly and unsalable article. It is customarily the practice to provide an interior support pressing on the inner sides of the parts to be joined to insure a continual uniform pressure and positive registering of the opposed parts about the opening or slot until the joint is finally set by vulcanization. I accomplish this result by "pulling" the parts, so to speak, against the closing-mold-supporting-walls instead of "pushing" the parts as is the usual practice, thereby obviating the necessity of a second core or inner support and the time and trouble of placing it in position and removing it from the neck of the bottle after the closure has been effected.

In order to produce the desired "pull" of the rubber parts, I place the vulcanized rubber about the slot under tension in a direction transversely of the slot, which tension acts to draw or pull and to hold the rubber parts against their supporting walls. To provide for this tension in the preferred embodiment of my invention, I form upon the walls of the slot or opening opposed flanges 12—12 and place these under a tension during the closing or vulcanizing operation. The tension is attained in the preferred embodiment by providing the flanges with marginal locking beads 13—13 which serve to lock the flanges in a transversely stretched or tensioned state within the closing mold sections 10—10. The mold sections 10 have suitable cavities formed therein for forming the flanges 12—12 and locking beads 13—13. In the present instance, these flanges and beads are interrupted midway of their lengths to provide for the usual tab 3 which extends from the side walls of the bottle. The tab is preferably formed in sections extending in oppositely disposed relation from either side of the slot. It is provided with the usual orifice 14 which is formed by lugs projecting from the mold sections, for suspending the bottle in inverted position in the usual manner when not in use.

The closing and tensioning mold 10 is provided with cavities similar to those in the forming mold for receiving the flanges 12—12, and beads 13—13. It is further provided with a pin 15 for mounting the tab thereon. In this tensioning mold however the cavities for receiving the flanges 12—12 are somewhat wider than the flanges themselves so that when the beads 13—13 are forced into their respective cavities the necessary stretch will be produced in the already-vulcanized rubber composing the flanges. Likewise the pin 15 is farther spaced from the supporting walls 11—11 than is the orifice 14 from the walls about the slot, thereby producing a corresponding stretch in the tab when mounting it upon the pin 15. The stretch in the rubber composing the tab and flanges serves to pull and hold the base of the bottle firmly and continually against the supporting walls 11.

In forming the slot 9, it must be of sufficient length to permit the withdrawal of the core therethrough. The slot need not be as long as the width of the core by any means for the vulcanized rubber about the slot will obviously permit of stretching to a considerable extent to facilitate the withdrawal of the core. In this connection however the elasticity of the vulcanized rubber material composing the bottle must be taken into consideration. It is desirable to produce as small a slot as is feasible and therefore maximum stretching must be resorted to with the attendant possibility of tearing the slot at the ends. To provide against this and to produce a stronger closure in the finished product, I preferably continue the flanges 12—12 and beads 13—13 for substantial distances beyond the ends of the opening, and as the tongue 6 does not intercept these extending end portions, their opposing faces are consequently brought together, when the mold sections 10 are closed, and are vulcanized together simultaneously with the vulcanization of the material composing the body of the bottle. The slot therefore is formed not only by the margin of the bottle, but also by the opposed flanges and beads, thereby making a very strong opening eliminating any danger of tearing the body portion of the bottle when withdrawing the core.

In practising my method, the bottle having been formed and vulcanized in the mold sections 4—4, it is withdrawn therefrom and the core removed through the slot. The base of the bottle containing the slot is then placed between the closing and tensioning mold sections 10—10 with a strip 16 of vulcanizable rubber inserted between the flanges 12—12 and another strip 17 between the members of the tab 3. The strips may be conveniently circular in cross-section, and the latter strip is preferably put between the tab members in the form of a ring mounted upon the pin 15.

When the mold sections 10—10 are brought together they exert a pressure upon the vulcanized rubber flanges 12—12 which has a tendency to flatten them or stretch them transversely. This flattening or stretching transversely would ordinarily result in forcing the margins of the bottle away from the supporting walls 11—11. On account of the flanges 12—12 being previously stretched transversely by the tensioning mold and held in this condition by the locking beads 13—13 coöperating with the cavities formed in the mold sections, the above mentioned tendency for displacement of the margins is overcome, and accurate alinement thereof effected.

The pressure produced by the closing mold sections 10—10 and the heat of vulcanization spreads out or flattens the strip 16 and ring 17, the latter forming a thin layer of rubber between the opposed tab members and the former providing a thin layer of rubber between the opposed walls of the slot, thereby entirely closing the opening. The strip 16 in flattening out flows or travels toward the interior of the bottle and as the pressure upon the flanges 12—12 is more pronounced than that upon the opposed margins of the bottle about the slot, the slot-closing strip of rubber between the flanges will consequently be of greater density than that between the sides of the bottle. And furthermore as there is no inner supporting wall to prevent, the closing strip of rubber will flow or move toward the interior of the bottle and the surplus or over-flow will emerge from the opening on the inside of the bottle to form a strengthening bank 18 of rubber about the closure.

In the modification shown in Fig. 7, the walls 19 of the slot are formed to converge toward the interior of the bottle which increases the resistance to the flow of the closing strip 16 in forming the bank 18 and thereby produces greater compression or density of the portion of the closing strip between these walls.

The bottle in its completed and finally vulcanized condition has a flash or fin of rubber extending from its joined edges which represents the over-flow and is usually found in all molded articles. This flash is finally removed and simultaneously therewith, if desired, the beads 13—13 are also removed. Part of the flanges 12—12 or all of them may be removed if desired. I prefer however to remove only part of the flanges and to have the parts left intact taper from the tabs toward their ends and to merge at their ends into the margin of the bottle as clearly shown in Fig. 6. This flange materially strengthens the bottle as it contains the portion of the closing strip of rubber that has received the greater pressure during the vulcanizing treatment.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:—

1. A water bottle comprising oppositely disposed rubber walls vulcanized together about the major portion of their edges simultaneously with the vulcanization of the said walls and an elongated strip of rubber V-shaped at its ends disposed between another portion of said edges and vulcanized thereto simultaneously with the vulcanization of said strip.

2. A water bottle characterized by having its major portion including its side walls and the major portion of their contacting edges vulcanized simultaneously and a further portion of elongated shape and having V-shaped end portions vulcanized and vulcanized to the first-mentioned vulcanized portion simultaneously.

Signed at New Haven, Conn., this 12 day of June, 1918.

JEREMIAH L. MAHONEY.